(12) United States Patent
Gao et al.

(10) Patent No.: US 12,021,186 B2
(45) Date of Patent: Jun. 25, 2024

(54) FRAMEWORK SUPPORTED SOLID-STATE ELECTROLYTE COMPOSITES FOR ALL-SOLID-STATE BATTERIES

(71) Applicant: The Hong Kong University of Science and Technology, Hong Kong (CN)

(72) Inventors: Ping Gao, Hong Kong (CN); Minhua Shao, Hong Kong (CN); Jiadong Li, Hong Kong (CN); Qiao Gu, Hong Kong (CN); Jin Li, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 81 days.

(21) Appl. No.: 17/225,356

(22) Filed: Apr. 8, 2021

(65) Prior Publication Data
US 2021/0336290 A1 Oct. 28, 2021

Related U.S. Application Data

(60) Provisional application No. 63/101,317, filed on Apr. 27, 2020.

(51) Int. Cl.
*H01M 10/0562* (2010.01)
*H01M 4/38* (2006.01)
*H01M 4/66* (2006.01)

(52) U.S. Cl.
CPC ....... *H01M 10/0562* (2013.01); *H01M 4/382* (2013.01); *H01M 4/662* (2013.01);
(Continued)

(58) Field of Classification Search
CPC .. H01M 10/0562; H01M 4/382; H01M 4/662; H01M 2300/0082; H01M 2300/0088
See application file for complete search history.

(56) References Cited

U.S. PATENT DOCUMENTS

| 10,566,652 B2 | 2/2020 | Dai et al. | |
| 2006/0292444 A1* | 12/2006 | Chiang | H01M 6/16 429/231.95 |

(Continued)

FOREIGN PATENT DOCUMENTS

| CN | 106654276 A | 5/2017 |
| CN | 108155414 A | 6/2018 |
| CN | 110137568 A | 8/2019 |

OTHER PUBLICATIONS

Yang, C. et al., "An Electron/Ion Dual-Conductive Alloy Framework for High-Rate and High-Capacity Solid-State Lithium-Metal Batteries", Advanced Materials, 2019, 31(1804815):1-7, WILEY-VCG Verlag GmbH & Co. KGaA, Weinheim.

(Continued)

*Primary Examiner* — Sarah A. Slifka
(74) *Attorney, Agent, or Firm* — Saliwanchik, Lloyd & Eisenschenk

(57) ABSTRACT

An all-solid-state battery system having a solid-state electrolyte composite is provided. The solid-state electrolyte composite includes a porous framework providing support and mechanical strength for the solid-state electrolyte composite and a plurality of ionic conductors filling voids of the porous framework for maximizing ionic conductance of the solid-state electrolyte composite. The porous framework may be made of ultra-high-molecular-weight polyethylene (UHMWPE) polymers and the plurality of ionic conductors may be made of poly(ethylene oxide)-$LiN(SO_2CF_3)_2$ (PEO-LiTFSI) polymers. The all-solid-state battery system includes battery cells each including a cathode current collector, a cathode disposed beneath and connected to the cathode current collector, the solid-state electrolyte composite disposed beneath and connected to the cathode, an anode disposed beneath and connected to the solid-state electrolyte (Continued)

composite, and an anode current collector disposed beneath and connected to the anode.

20 Claims, 4 Drawing Sheets

(52) U.S. Cl.
CPC .............. *H01M 2300/0082* (2013.01); *H01M 2300/0088* (2013.01)

(56) References Cited

U.S. PATENT DOCUMENTS

| | | | |
|---|---|---|---|
| 2014/0272600 A1* | 9/2014 | Bouchet | C08F 293/005 528/321 |
| 2017/0125868 A1* | 5/2017 | Kim | H01M 10/0565 |
| 2018/0183055 A1* | 6/2018 | Chang | H01M 10/0565 |
| 2019/0067731 A1* | 2/2019 | Kashiwazaki | H01M 50/491 |
| 2019/0097208 A1* | 3/2019 | Kawase | H01M 4/0404 |
| 2020/0075993 A1 | 3/2020 | Ling et al. | |

OTHER PUBLICATIONS

Fu, K. (K.) et al., "Flexible, solid-state, ion-conducting membrane with 3D garnet nanofiber networks for lithium batteries", PNAS, Jun. 28, 2016, 113(26):7094-7099.

* cited by examiner

US 12,021,186 B2

FRAMEWORK SUPPORTED SOLID-STATE ELECTROLYTE COMPOSITES FOR ALL-SOLID-STATE BATTERIES

CROSS-REFERENCE TO RELATED APPLICATION

This application claims the benefit of U.S. Provisional Application Ser. No. 63/101,317, filed Apr. 27, 2020, which is hereby incorporated by reference in its entirety including any tables, figures, or drawings.

FIELD OF THE INVENTION

The subject invention relates to the solid-state electrolyte for all-solid-state batteries. More particularly, the invention relates to an ultrathin polymer framework supported solid-state electrolyte composite with high ionic conductance and enhanced mechanical strength for all-solid-state batteries.

BACKGROUND OF THE INVENTION

All-solid-state batteries have been widely recognized as an alternative solution to the conventional batteries using non-aqueous electrolytes. The employment of solid-state electrolyte alleviates safety concerns and promotes direct use of alkaline metals, such as Li, Na, K, as the battery anodes to break through the energy bottleneck.

Several examples of solid-state electrolyte solutions are found in CN patent applications CN 106654276 A and CN 110137568 A. Fillers such as alumina, titanium oxide and sulfide or ceramic type ionic conductors were utilized to reduce the polymeric crystallinity. However, these methods could barely enhance mechanical properties of the battery systems. In some other patents including U.S. Pat. No. 10,566,652 B2, multi-layered electrolytes were designed to integrate the beneficial properties of multiple materials into one battery system. Nevertheless, issues including large dimensions and low conductance were still not resolved.

Despite all the efforts, it is still challenging for the existing solid-state electrolyte composites to meet the requirements of various applications for both high ionic conductance and enhanced mechanical strength.

BRIEF SUMMARY OF THE INVENTION

There continues to be a need in the art for improved designs and techniques for all-solid-state battery systems to provide enhanced mechanical property and high ionic conductance to promote performance of the all-solid-state battery systems.

Embodiments of the subject invention pertain to a framework supported solid-state electrolyte composite including at least one ionic conductor providing the ionic conductivity and at least one porous framework providing the mechanical strength for the solid-state electrolyte composite.

According to an embodiment of the subject invention, a solid-state electrolyte composite for a solid-state battery comprises a porous framework for providing support and mechanical strength for the solid-state electrolyte composite and a plurality of ionic conductors filling voids of the porous framework for maximizing ionic conductance. The porous framework comprises a plurality of units interconnected into one or more patterns, forming a continuous network. Moreover, the porous framework comprises a porous three-dimensional (3D) structure or a porous two-dimensional (2D) structure. The porous framework may be made of ultra-high-molecular-weight polyethylene (UHMWPE) polymers and the plurality of ionic conductors may include poly(ethylene oxide)-LiN(SO$_2$CF$_3$)$_2$ (PEO-LiTFSI) polymers. The solid-state electrolyte composite supported by the porous framework may have a shape of a film or a slab and a thickness of about 3 μm. The porous framework is configured to have an effective framework porosity of about 40% to obtain a tensile strength of about 550 Mpa and a puncture resistance of about 1.5 N μm$^{-1}$. Furthermore, the PEO-LiTFSI polymers of the plurality of ionic conductors may have a ratio of ethylene oxide (EO) to lithium-ion of about 10:1 to obtain a lithium-ion conductivity of $1.8*10^{-5}$ S cm$^{-1}$ at a temperature of 22° C.

In another embodiment of the subject invention, an all-solid-state battery cell comprises a cathode current collector, a cathode disposed beneath the cathode current collector, a solid-state electrolyte composite disposed beneath the cathode, comprising a porous framework for providing support and mechanical strength for the solid-state electrolyte composite and a plurality of ionic conductors filling voids of the porous framework for maximizing ionic conductance, an anode disposed beneath the solid-state electrolyte composite, and an anode current collector disposed beneath the anode. Moreover, the cathode current collector can be made of aluminum (Al), the cathode can be made of lithium iron phosphate (LiFePO4), conductive carbon Super P, and PEO-LiTFSI, the anode can be made of lithium (Li), and the anode current collector can be made of copper (Cu). Further, the all-solid-state battery cell can be configured to have a specific capacity of about 140 mAh g$^{-1}$ when the all-solid-state battery cell is operated at a 1.0 C charge/discharge rate and to retain 93% of an initial specific capacity after 900 cycles of charging/discharging at a 1.0 C charge/discharge rate.

BRIEF DESCRIPTION OF THE DRAWINGS

Some embodiments of the subject invention are illustrated as an example and are not limited by the figures of the accompanying drawings, in which like references may indicate similar elements and in which.

DETAILED DISCLOSURE OF THE INVENTION

The terminology used herein is only for the purpose of describing particular embodiments and is not intended to be limiting of the invention. As used herein, the term "and/or" includes any and all combinations of one or more of the associated listed items. As used herein, the singular forms "a", "an" and "the" are intended to include the plural forms as well as the singular forms, unless the context clearly indicates otherwise. It will be further understood that the terms "comprise" and/or "comprising," when used in this specification, specify the presence of stated features, steps, operations, elements, and/or components, but do not preclude the presence or addition of one or more other features, steps, operations, elements, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has the individual benefit and each also is used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the subject invention. It will be evident, however, to one skilled in the art that the subject invention may be practiced without these specific details.

The present disclosure is to be considered as an exemplification of the invention and is not intended to limit the invention to the specific embodiments illustrated by the figures or description below.

The subject invention will now be described by referencing the appended figures representing preferred embodiments.

Figure 1A:
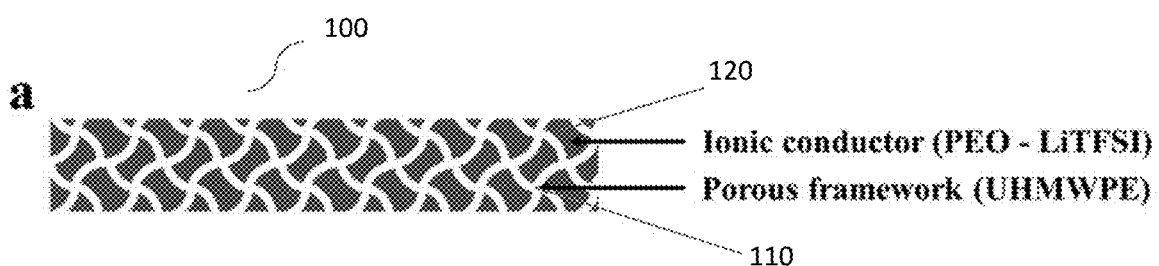
FIG. 1A is a schematic representation of a framework supported solid-state electrolyte film of an all-solid-state battery cell, according to an embodiment of the subject invention.

All-Solid-State Battery Cells Comprising Framework Supported Solid-State Electrolyte Composites FIG. 1A shows the structure of one example of the framework supported solid-state electrolyte composite 100 in a form of a thin film according to various embodiments of the subject invention. The framework supported solid-state electrolyte film 100 can comprise a porous framework 110 serving as a skeleton of the solid-state electrolyte composite 100 and a plurality of ionic conductors 120 that fills voids of the porous framework 110.

As illustrated in FIG. 1A, the porous framework 110 can comprise a plurality of units interconnected into one or more patterns, creating a continuous network. As a result of the continuously interconnected network structure, the porous framework 110 provides advantages including enhanced mechanical strength and improved integrity for the framework supported solid-state electrolyte composite 100.

In one embodiment, the porous framework 110 may have a porous two-dimensional (2D) structure.

In another embodiment, the porous framework 110 may have a porous three-dimensional (3D) structure.

In preferred embodiments, the porous framework 110 can be made of, for example, ultra-high-molecular-weight polyethylene (UHMWPE) polymers, and the plurality of ionic conductors 120 can be made of, for example, poly(ethylene oxide)-LiN(SO$_2$CF$_3$)$_2$(LiTFSI) (PEO-LiTFSI) polymers. In preparation of the framework supported solid-state electrolyte film 100, the plurality of ionic conductors 120 such as poly(ethylene oxide)-LiN(SO$_2$CF$_3$)$_2$(LiTFSI) (PEO-LiTFSI) polymers is immersed into the porous framework 110 made of, for example, ultra-high-molecular-weight polyethylene (UHMWPE) polymers. The ionic conductors 120 are infiltrated into the structure of the porous framework 110 and fill the interspace between the continuous network, forming the framework supported solid-state electrolyte composite film 100.

In one embodiment, the ionic conductors 120 are configured to entirely fill the pores of the porous framework 110.

In another embodiment, selected additional components, such as fillers, plasticizers, or different types of ionic conductors, can be added together with the ionic conductors 120 to fill the interspace of pores of the porous framework 110, in order to improve certain aspects of the performance of the framework supported solid-state electrolyte composite film 100. For example, the fillers including but not limited to, alumina, silica, titanium oxides, can be added to enhance the ionic conductivity and mechanical property or facilitate the electrolyte-electrode interface formation. In another example, the plasticizers may include but are not limited to succinonitrile (SN) or ethylene carbonate (EC). In yet another example, the ionic conductors may include but are not limited to Li$_7$La$_3$Zr$_2$O$_{12}$ (LLZO) or Li$_{10}$GeP$_2$S$_{12}$ (LGPS).

In preferred embodiments, the framework supported solid-state electrolyte composite film 100 may have a thickness smaller than 10 μm, preferably smaller than or equal to 3 μm.

In preferred embodiments, the framework supported solid-state electrolyte composite film 100 can have an effective framework porosity of around 40%, achieving ultra-high tensile strength of about 550 Mpa and a puncture resistance of about 1.5 N μm$^{-1}$ with a film thickness of about 3 μm.

In preferred embodiments, a ratio of ethylene oxide (EO) to lithium-ion of the PEO-LiTFSI composites of the plurality of ionic conductors may be configured to be about 10:1 such that a lithium-ion conductivity of 1.8*10$^{-5}$ S cm$^{-1}$ at a temperature of 22° C. can be obtained.

In one embodiment, the lithium-ion conductivity of the fabricated framework supported solid-state electrolyte film 100 is about 1.5*10$^{-5}$ S cm$^{-1}$ at a temperature of 22° C.

Comparing with a conventional PEO-LiTFSI film having a thickness of about 200 the framework supported solid-state electrolyte composite film 100 of the subject invention having a film thickness of about 3 μm achieves a lithium-ion conductance that is more than 30 times greater.

Figure 1B:
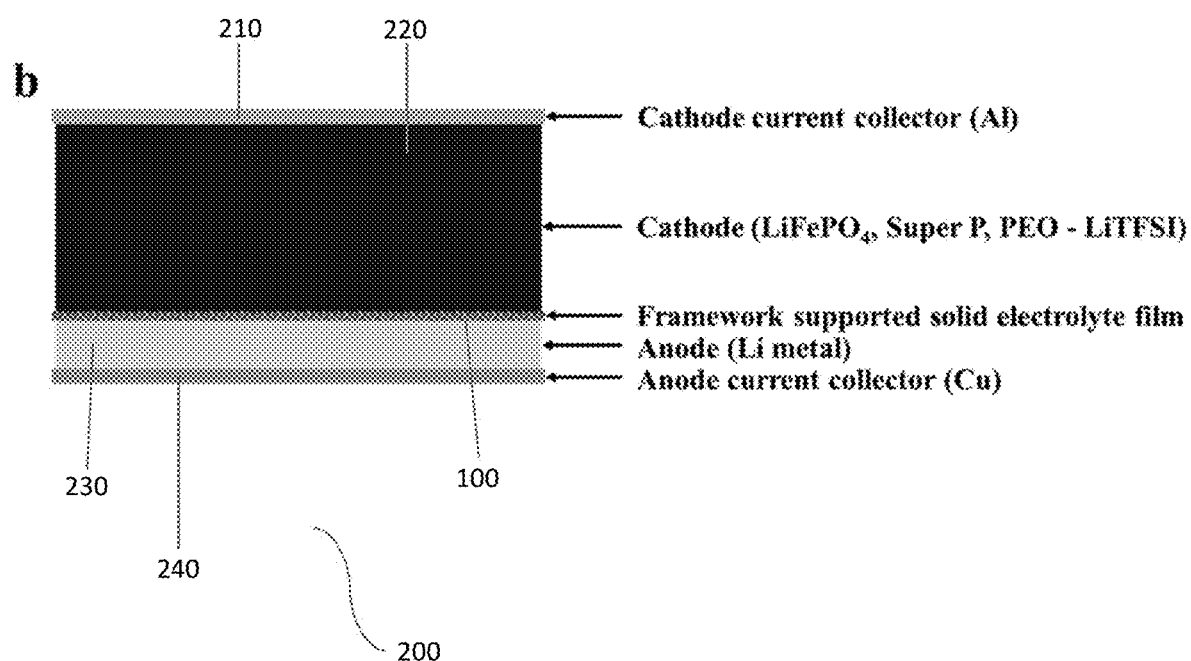
FIG. 1B is a schematic representation showing a stacking sequence of the all-solid-state battery cell comprising the framework supported solid-state electrolyte film, according to an embodiment of the subject invention.

FIG. 1B shows the structure and the stacking sequence of one preferred embodiment of the all-solid-state battery cell 200 comprising the framework supported solid-state electrolyte film 100 of FIG. 1A, according to various embodiments of the subject invention. The all-solid-state battery cell 200 comprises a cathode current collector 210, a cathode 220, the framework supported solid-state electrolyte film 100, an anode 230, and an anode current collector 240.

In one embodiment, the cathode current collector 210 is disposed on the cathode 220 that is in turn disposed on the framework supported solid-state electrolyte film 100, and the framework supported solid-state electrolyte film 100 is disposed on the anode 230 that is in turn disposed on the anode current collector 240.

Moreover, the cathode current collector 210 may be disposed to be in direct contact with the cathode 220. Similarly, the cathode 220 may be disposed to be in direct contact with the framework supported solid-state electrolyte film 100, the framework supported solid-state electrolyte film 100 may be disposed to be in direct contact with the anode 230, and the anode 230 may be disposed to be in direct contact with the anode current collector 240.

In one embodiment, the cathode current collector 210 is made of a metal material such as aluminum (Al).

In one embodiment, the cathode 220 is made of, for example, lithium iron phosphate (LiFePO$_4$), conductive carbon Super P, and PEO-LiTFSI.

In one embodiment, the anode 230 is made of, for example, a metal material such as lithium (Li).

In one embodiment, the anode current collector 240 is made of a metal material such as copper (Cu).

Characterization Tests

Figure 2:
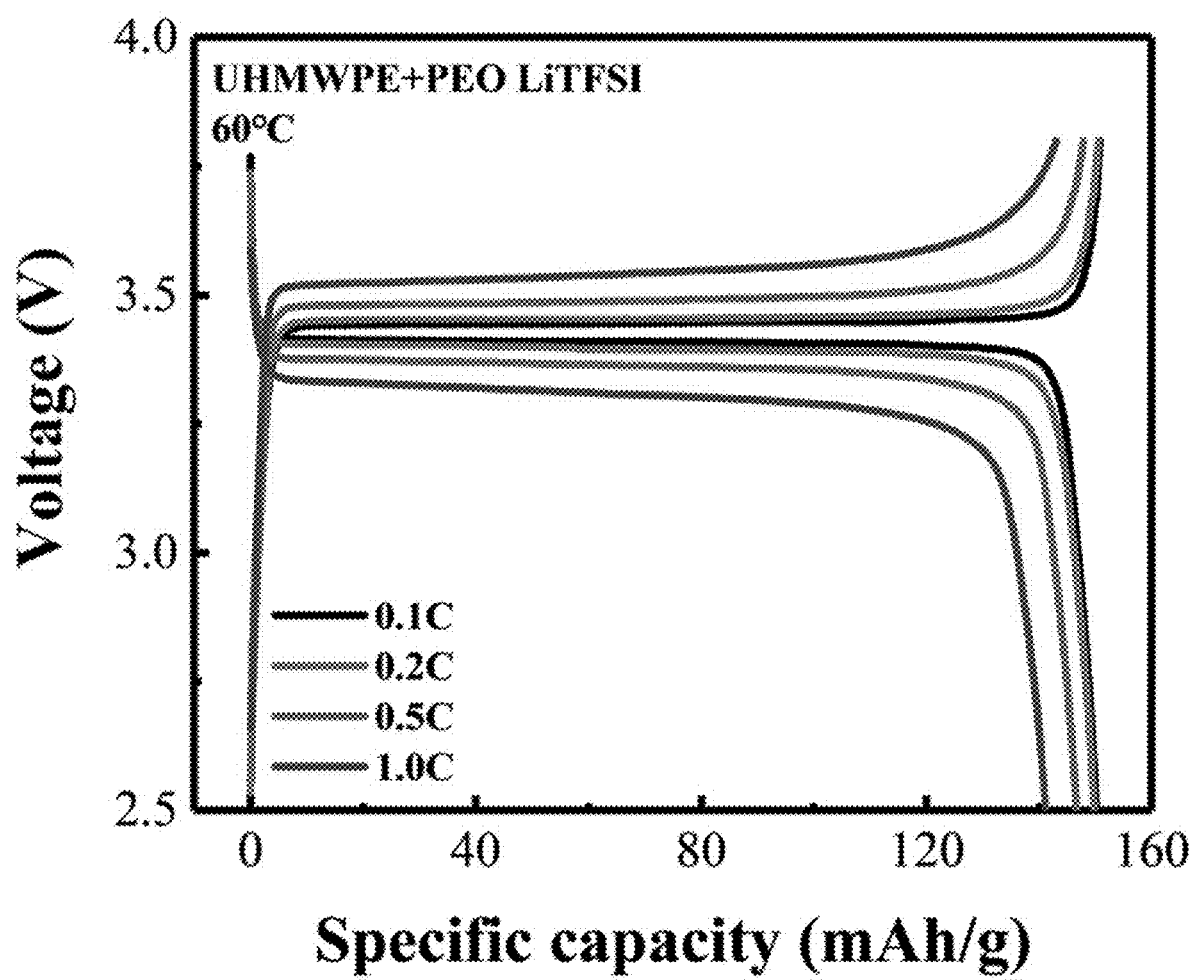
FIG. 2 is a plot diagram showing rate capabilities of the all-solid-state battery having the framework supported solid-state electrolyte film at a temperature of 60° C., according to an embodiment of the subject invention.

Referring to FIG. 2, the rate capabilities of the all-solid-state battery cell 200 comprising the framework supported solid-state electrolyte film 100 are tested at a temperature of about 60° C. In these tests, lithium iron phosphate is selected as the cathode material and the lower and upper cut-off voltages are set to be 2.5V and 3.8V, respectively. It is observed that when the all-solid-state battery cell 200 is controlled to have a 1.0 C charge/discharge rate, a specific capacity of about 140 mAh g$^{-1}$ can be achieved. Further, it is observed that when the all-solid-state battery cell 200 is controlled to have a 0.1 C charge/discharge rate, a specific capacity of about 149 mAh g$^{-1}$ can be achieved.

Figure 3:
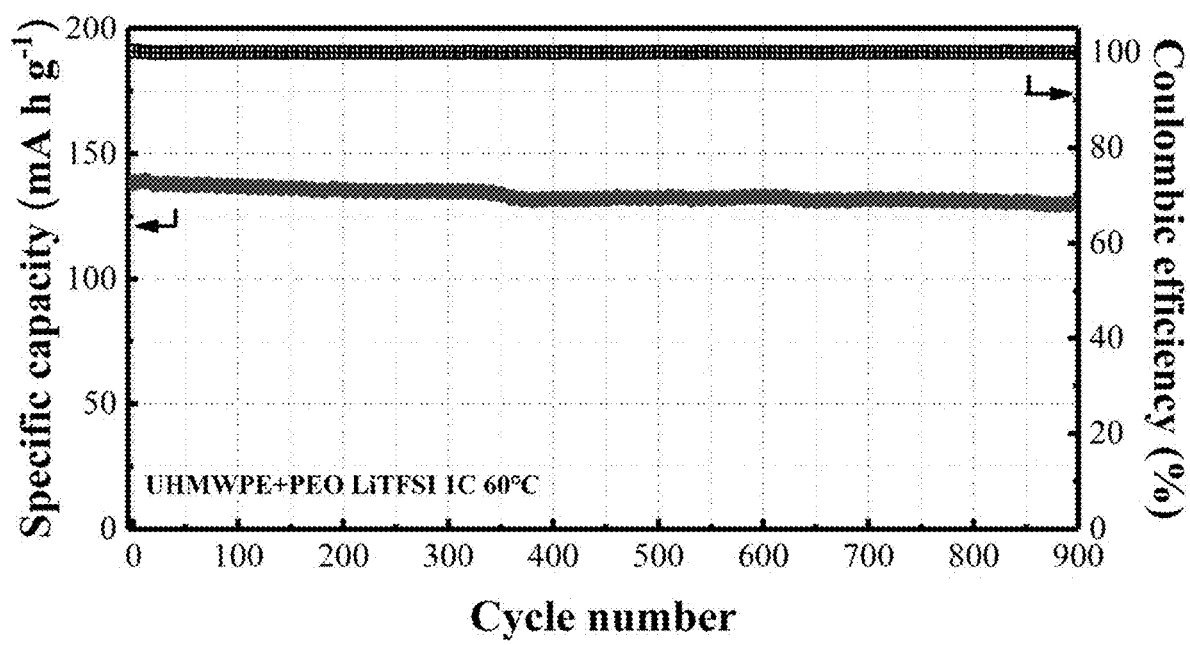
FIG. 3 is a plot diagram showing cycling performance of the all-solid-state battery having the framework supported solid-state electrolyte film at a temperature of 60° C., according to an embodiment of the subject invention.

Now referring to FIG. 3, the cycling performance of the all-solid-state battery cell 200 comprising the framework supported solid-state electrolyte film 100 is tested at a temperature of about 60° C. In these tests, the lower and upper cut-off voltages are set to be 2.5V and 3.8V, respectively. The all-solid-state battery cell 200 is charged and then discharged for a duration of 900 cycles at a 1.0 C charge/discharge rate. Although the specific capacity of the all-solid-state battery cell 200 gradually decreases over the cycling time, a specific capacity of about 93% of the initial specific capacity (measured at the beginning of the tests) can be retained after the 900 cycles of testing.

Referring to FIG. 3 again, during the tests, it is observed that the coulombic efficiency of the all-solid-state battery cell 200 barely changes after 900 cycles of testing and remains at about 100% throughout the cycling processes.

Although the subject invention has been illustrated and described herein with reference to preferred embodiments and specific examples thereof, it will be readily apparent to those of ordinary skill in the art that other embodiments and examples may perform similar functions and/or achieve like results.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1] Tian, W., Shi, B., Wu, Y. & Tang, W. (2016). CN Patent No. 106654276A.
[2] Ci, L. & Cheng, J. (2019) CN Patent No. 110137568A.
[3] Fang, D. A. I., Yang, L., Yersak, T. A., Salvador, J. R., & Cai, M. (2020).
[4] U.S. Pat. No. 10,566,652. Washington, DC: U.S. Patent and Trademark Office.

We claim:

1. A solid-state electrolyte composite for a solid-state battery, comprising:
    a porous framework providing support and mechanical strength for the solid-state electrolyte composite;
    a plurality of ionic conductors filling voids of the porous framework for maximizing ionic conductance of the solid-state electrolyte composite, the plurality of ionic conductors comprising Li$_7$La$_3$Zr$_2$O$_{12}$ (LLZO) or Li$_{10}$GeP$_2$S$_{12}$ (LGPS); and
    plasticizers including succinonitrile (SN) filling the voids of the porous framework with the plurality of ionic conductors;
    wherein the porous framework is made of ultra-high-molecular-weight polyethylene (UHMWPE) polymers.

2. The solid-state electrolyte composite of claim 1, wherein the porous framework comprises a plurality of units interconnected into one or more patterns, forming a continuous network.

3. The solid-state electrolyte composite of claim 1, wherein the plurality of ionic conductors comprise Li$_7$La$_3$Zr$_2$O$_{12}$ (LLZO).

4. The solid-state electrolyte composite of claim 1, wherein the plurality of ionic conductors comprise Li$_{10}$GeP$_2$S$_{12}$ (LGPS).

5. The solid-state electrolyte composite of claim 1, wherein the plurality of ionic conductors comprise poly (ethylene oxide)-LiN(SO$_2$CF$_3$)$_2$ (PEO-LiTFSI) polymers.

6. The solid-state electrolyte composite of claim 5, wherein the PEO-LiTFSI polymers comprise a ratio of ethylene oxide (EO) to lithium-ion of about 10:1.

7. The solid-state electrolyte composite of claim 6, wherein the PEO-LiTFSI polymers are configured to have a lithium-ion conductivity of $1.8*10^{-5}$ S cm$^{-1}$ at a temperature of 22° C.

8. The solid-state electrolyte composite of claim 1, wherein the solid-state electrolyte composite supported by the porous framework has a shape of a film or a slab.

9. The solid-state electrolyte composite of claim 8, wherein the solid-state electrolyte composite supported by the porous framework is configured to have a thickness of about 3 μm.

10. The solid-state electrolyte composite of claim 9, wherein the porous framework is configured to have an effective framework porosity of about 40%.

11. The solid-state electrolyte composite of claim 10, wherein the solid-state electrolyte composite supported by the porous framework is configured to have a tensile strength of about 550 Mpa.

12. The solid-state electrolyte composite of claim 10, wherein the solid-state electrolyte composite supported by the porous framework is configured to have a puncture resistance of about 1.5 N μm$^{-1}$.

13. An all-solid-state battery cell system, comprising:
    a cathode current collector;

a cathode disposed beneath the cathode current collector and coupled to the cathode current collector;

a solid-state electrolyte composite disposed beneath the cathode and coupled to the cathode, comprising a porous framework providing support and mechanical strength for the solid-state electrolyte composite, a plurality of ionic conductors filling voids of the porous framework for maximizing ionic conductance of the solid-state electrolyte composite, the plurality of ionic conductors comprising $Li_7La_3Zr_2O_{12}$ (LLZO) or $Li_{10}GeP_2S_{12}$ (LGPS); and plasticizers including succinonitrile (SN) filling the voids of the porous framework with the plurality of ionic conductors, wherein the porous framework is made of ultra-high-molecular-weight polyethylene (UHMWPE) polymers;

an anode disposed beneath the solid-state electrolyte composite and coupled to the solid-state electrolyte composite; and an anode current collector disposed beneath the anode and coupled to the anode.

14. The all-solid-state battery cell system of claim 13, wherein the cathode current collector is made of aluminum (Al).

15. The all-solid-state battery cell system of claim 13, wherein the cathode is made of lithium iron phosphate (LiFePO$_4$), conductive carbon Super P, and PEO-LiTFSI.

16. The all-solid-state battery cell system of claim 13, wherein the plurality of ionic conductors comprise $Li_7La_3Zr_2O_{12}$ (LLZO).

17. The all-solid-state battery cell system of claim 13, wherein the plurality of ionic conductors comprise $Li_{10}GeP_2S_{12}$ (LGPS).

18. The all-solid-state battery cell system of claim 13, wherein the all-solid-state battery cell system is configured to have a specific capacity of about 140 mAh g$^{-1}$, when the all-solid-state battery cell is operated at a 1.0 C charge/discharge rate.

19. The all-solid-state battery cell system of claim 13, wherein the all-solid-state battery cell is configured to retain 93% of an initial specific capacity after 900 cycles of charging/discharging at a 1.0 C charge/discharge rate.

20. A solid-state electrolyte composite for a solid-state battery, comprising:

a porous framework providing support and mechanical strength for the solid-state electrolyte composite;

a plurality of ionic conductors filling voids of the porous framework for maximizing ionic conductance of the solid-state electrolyte composite, the plurality of ionic conductors comprising $Li_7La_3Zr_2O_{12}$ (LLZO) or $Li_{10}GeP_2S_{12}$(LGPS); and plasticizers including succinonitrile (SN) filling the voids of the porous framework with the plurality of ionic conductors;

wherein the porous framework is made of ultra-high-molecular-weight polyethylene (UHMWPE) polymers, wherein the porous framework comprises a plurality of units interconnected into one or more patterns, forming a continuous network, wherein the plurality of ionic conductors comprise poly (ethylene oxide)-LiN(SO$_2$CF$_3$)$_2$ (PEO-LiTFSI) polymers, wherein the solid-state electrolyte composite supported by the porous framework has a shape of a film or a slab, wherein the solid-state electrolyte composite supported by the porous framework is configured to have a thickness of about 3 μm, wherein the porous framework is configured to have an effective framework porosity of about 40%, wherein the solid-state electrolyte composite supported by the porous framework is configured to have a tensile strength of about 550 Mpa, wherein the solid-state electrolyte composite supported by the porous framework is configured to have a puncture resistance of about 1.5 N μm$^{-1}$, wherein the PEO-LiTFSI polymers comprise a ratio of ethylene oxide (EO) to lithium-ion of about 10:1, and wherein the PEO-LiTFSI polymers are configured to have a lithium-ion conductivity of $1.8*10^{-5}$ S cm$^{-1}$ at a temperature of 22° C.

* * * * *